United States Patent
Nakamura et al.

(10) Patent No.: US 6,519,006 B1
(45) Date of Patent: Feb. 11, 2003

(54) IMAGE ASPECT RATIO CONVERTING APPARATUS

(76) Inventors: Akira Nakamura, c/o NHK Broadcasting Center, 2-1, Jinnan 2-chome, Shibuya-ku, Tokyo 150-8001 (JP); Tadafumi Kuno, c/o NHK Broadcasting Center, 2-1, Jinnan 2-chome, Shibuya-ku, Tokyo 150-8001 (JP); Shunichi Okada, c/o NHK Broadcasting Center, 2-1, Jinnan 2-chome, Shibuya-ku, Tokyo 150-8001 (JP); Noriyuki Goto, c/o NHK Broadcasting Center, 2-1, Jinnan 2-chome, Shibuya-ku, Tokyo 150-8001 (JP); Hiroyuki Torii, c/o NHK Broadcasting Center, 2-1, Jinnan 2-chome, Shibuya-ku, Tokyo 150-8001 (JP); Masashi Kubota, c/o NHK Broadcasting Center, 2-1, Jinnan 2-chome, Shibuya-ku, Tokyo 150-8001 (JP); Sadaharu Okada, c/o NHK Broadcasting Center, 2-1, Jinnan 2-chome, Shibuya-ku, Tokyo 150-8001 (JP)

( * ) Notice: Subject to any disclaimer, the term of this patent is extended or adjusted under 35 U.S.C. 154(b) by 0 days.

(21) Appl. No.: 09/538,625

(22) Filed: Mar. 29, 2000

(30) Foreign Application Priority Data

Jul. 29, 1999 (JP) .......................... P11-215507

(51) Int. Cl.$^7$ ................................................ H04N 7/01
(52) U.S. Cl. ...................................... 348/445; 348/441
(58) Field of Search ................................ 348/445, 441, 348/454, 458; H04N 7/01

(56) References Cited

U.S. PATENT DOCUMENTS 5,956,092 A * 9/1999 Ebihara et al. ............. 348/445

FOREIGN PATENT DOCUMENTS

| JP | 03-082284 | 4/1991 |
| JP | 07-050765 | 2/1995 |

* cited by examiner

Primary Examiner—Sherrie Hsia

(57) ABSTRACT

An aspect ratio converter converts a still image signal having an aspect ratio of 4:3 to a still image signal having a predetermined wide aspect ratio. A both-end pixel extractor extracts predetermined amounts of both left and right end images of a horizontal scanning period of the still image signal having an aspect ratio of 4:3. A both-wing image data preparing unit and a both-wing extrapolator use the extracted images to extrapolate a region of from both left and right ends of the horizontal scanning period of the still image signal having an aspect ratio of 4:3 to both left and right ends of the horizontal scanning period of the still image signal having the wide aspect ratio.

5 Claims, 7 Drawing Sheets

IMAGE ASPECT RATIO CONVERTING APPARATUS

BACKGROUND OF THE INVENTION

1. Field of the Invention

The present invention relates to an image aspect ratio converting apparatus for converting an image material having an aspect ratio of 4:3 such as NTSC, PAL or SECAM to a wide image material having a different aspect ratio (e.g., an image material of a high vision having an aspect ratio of 16:9 and 480i). More particularly, it relates to an aspect ratio converting apparatus which performs the image processing of both ends in the horizontal direction of the wide image material obtained by the conversion.

2. Description of the Related Art

In a present broadcasting system, a screen aspect ratio is 4:3, but in a high vision, a transversely prolonged wide screen is used in which the screen aspect ratio is set to 16:9. The widening of this television screen is indispensable to regenerate an image more powerful than ever and to provide the feeling of realism. Moreover, television sets with a transversely long screen size (16:9) have actually been manufactured and spread.

In this case, a still image material having an aspect ratio of 4:3 is converted to a still image material having a wide aspect ratio (e.g., 16:9) so as to regenerate a similarly powerful image on a wide television screen.

However, when the still image material having an aspect ratio of 4:3 is outputted as it is onto the screen having an aspect ratio of 16:9, non-image portions inconveniently appear on both the ends in a horizontal direction on the screen having an aspect ratio of 16:9.

Therefore, as a countermeasure, in a conventional image aspect ratio converting apparatus, certain images colored, for example, black, green or blue are allotted to both the ends in the horizontal direction of the image having an aspect ratio of 16:9.

However, in the conventional system in which certain image signals are allotted to both the ends in the horizontal scanning direction of an image signal having the converted wide aspect ratio, the image looks as if a frame were fixed to both the ends, thereby resulting in the image lacking in natural property.

SUMMARY OF THE INVENTION

The present invention has been developed in consideration of the above-described situations, and an object thereof is to provide an image aspect ratio converting apparatus in which when an image material having an aspect ratio of 4:3 is outputted as it is to a screen having a wide aspect ratio, the image material can be converted to the image material having a wide aspect ratio while a natural property is held.

To attain the above-described object, there is provided an image aspect ratio converting apparatus comprising: aspect ratio converting means for converting an image signal having an aspect ratio of 4:3 to an image signal having a predetermined wide aspect ratio; image extracting means for extracting a predetermined amount of a left end image and a predetermined amount of a right end image of a horizontal scanning period of the image signal having an aspect ratio of 4:3; and extrapolating means for using the extracted predetermined amount of the left end image to extrapolate a region of from the left end of the horizontal scanning period of the image signal having an aspect ratio of 4:3 to the left end of the horizontal scanning period of the image signal having the wide aspect ratio, and for using the extracted predetermined amount of the right end image to extrapolate a region of from the right end of the horizontal scanning period of the image signal having an aspect ratio of 4:3 to the right end of the horizontal scanning period of the still image signal having the wide aspect ratio.

According to the present invention, on the basis of the predetermined amounts of left and right end images of the horizontal scanning period of the image signal having an aspect ratio of 4:3, the extrapolation is performed for a region of from the left end of the horizontal scanning period of the image signal having an aspect ratio of 4:3 to the left end of the horizontal scanning period of the image signal having the wide aspect ratio, and a region of from the right end of the horizontal scanning period of the image signal having an aspect ratio of 4:3 to the right end of the horizontal scanning period of the image signal having the wide aspect ratio.

Therefore, the image material having an aspect ratio of 4:3 can be converted to the image material having the wide aspect ratio while the natural property is held.

In a preferred embodiment for carrying out the present invention, the extrapolating means repeatedly applies one to several samples of images generated from the extracted predetermined amount of the left end image to the region of from the left end of the horizontal scanning period of the image signal having an aspect ratio of 4:3 to the left end of the horizontal scanning period of the image signal having the wide aspect ratio, and repeatedly applies one to several samples of images generated from the extracted predetermined amount of right end image to the region of from the right end of the horizontal scanning period of the image signal having an aspect ratio of 4:3 to the right end of the horizontal scanning period of the image signal having the wide aspect ratio.

According to this embodiment, the extrapolation of both the left and right ends can be performed by repeatedly applying the same image.

In another preferred embodiment for carrying out the present invention, the extrapolating means extrapolates the region of from the left end of the horizontal scanning period of the image signal having an aspect ratio of 4:3 to the left end of the horizontal scanning period of the image signal having the wide aspect ratio with an image so generated from the extracted predetermined amount of the left end image as to have a monotonously decreased gradation property, and extrapolates the region of from the right end of the horizontal scanning period of the image signal having an aspect ratio of 4:3 to the right end of the horizontal scanning period of the image signal having the wide aspect ratio with an image so generated from the extracted predetermined amount of the right end image as to have a monotonously decreased gradation property.

In the preferred embodiment for carrying out the present invention, the gradation property comprises at least one of luminance, hue, and γ property.

According to this embodiment, the gradation property can be changed to thereby extrapolate both the left and right ends.

In another preferred embodiment for carrying out the present invention, the extrapolating means extrapolates the region of from the left end of the horizontal scanning period of the image signal having an aspect ratio of 4:3 to the left end of the horizontal scanning period of the image signal having the wide aspect ratio with an image so generated from the extracted predetermined amount of left end image as to have a gradually increased defocus amount, and extrapolates the region of from the right end of the horizontal scanning period of the image signal having an aspect ratio of 4:3 to the right end of the horizontal scanning period of the image signal having the wide aspect ratio with an image so generated from the extracted predetermined amount of right end image as to have a gradually increased defocus amount.

According to this embodiment, the defocus amount of the image can be changed to thereby extrapolate both the left and right ends.

The nature, principle and utility of the invention will become more apparent from the following detailed description when read in conjunction with the accompanying drawings.

DETAILED DESCRIPTION OF THE PREFERRED EMBODIMENTS

Figure 1:
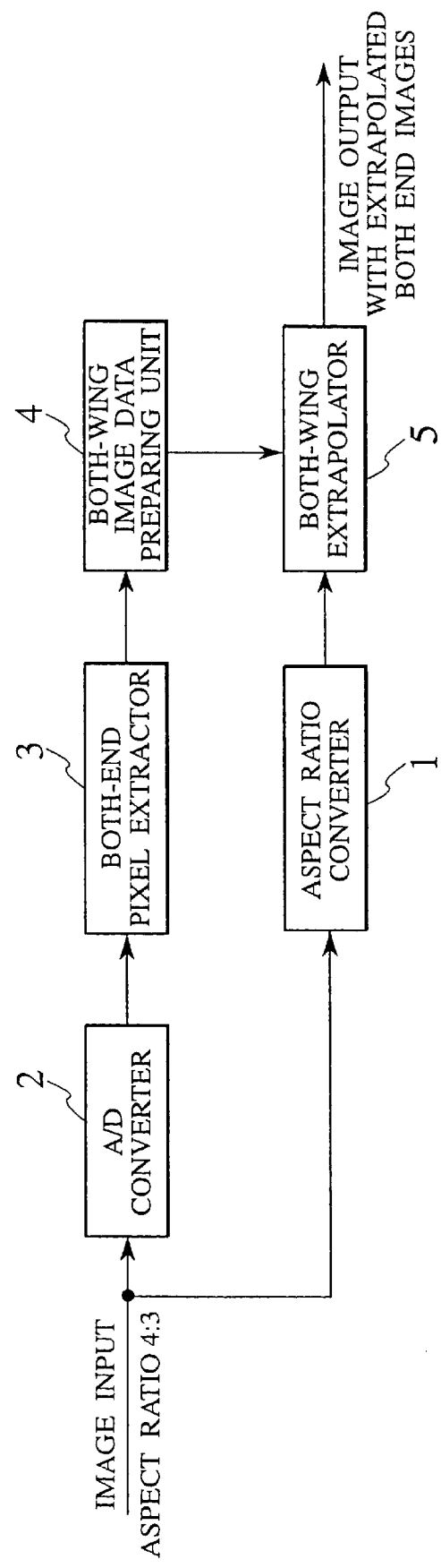
FIG. 1 is a block diagram showing the constitution of an image aspect ratio converting apparatus according to an embodiment of the present invention.

FIG. 1 shows the configuration of an image aspect ratio converting apparatus according to an embodiment of the present invention. In FIG. 1, the image aspect ratio converting apparatus is provided with an aspect ratio converter 1 and an A/D converter 2 which receive image inputs, a both-end pixel extractor 3 for receiving an output of A/D converter 2, a both-wing image data preparing unit 4 for receiving an output of both-end pixel extractor 3, and a both-wing extrapolator 5 for receiving outputs of aspect ratio converter 1 and both-wing image data preparing unit 4 and outputting an extrapolated image.

The correlation of the above-described configuration and claimed elements is as follows: the aspect ratio converter 1 corresponds to the aspect ratio converting means; mainly the both-end pixel extractor 3 corresponds to the image extracting means; and the both-wing image data preparing unit 4 and both-wing extrapolator 5 entirely correspond to the extrapolating means.

The operation of the image aspect ratio converting apparatus of the present embodiment will be described hereinafter with reference to FIGS. 1 to 8.

In FIG. 1, as the image input, the image signal of a still image material having an aspect ratio of 4:3, such as NTSC, PAL and SECAM, is inputted. Here, the description is made on the assumption that the image signal is NTSC. Moreover, the still image material having the wide aspect ratio to be outputted is described here as the still image material having an aspect ratio of 16:9, but the description may similarly be made even when another still image material such as 480i is obtained.

The aspect ratio converter 1 is, for example, an NTSC/high vision up-converter. The aspect ratio converter 1 converts the inputted NTSC image signal from an aspect ratio of 4:3 to 16:9, and sends an output thereof to the both-wing extrapolator 5.

Figure 2:
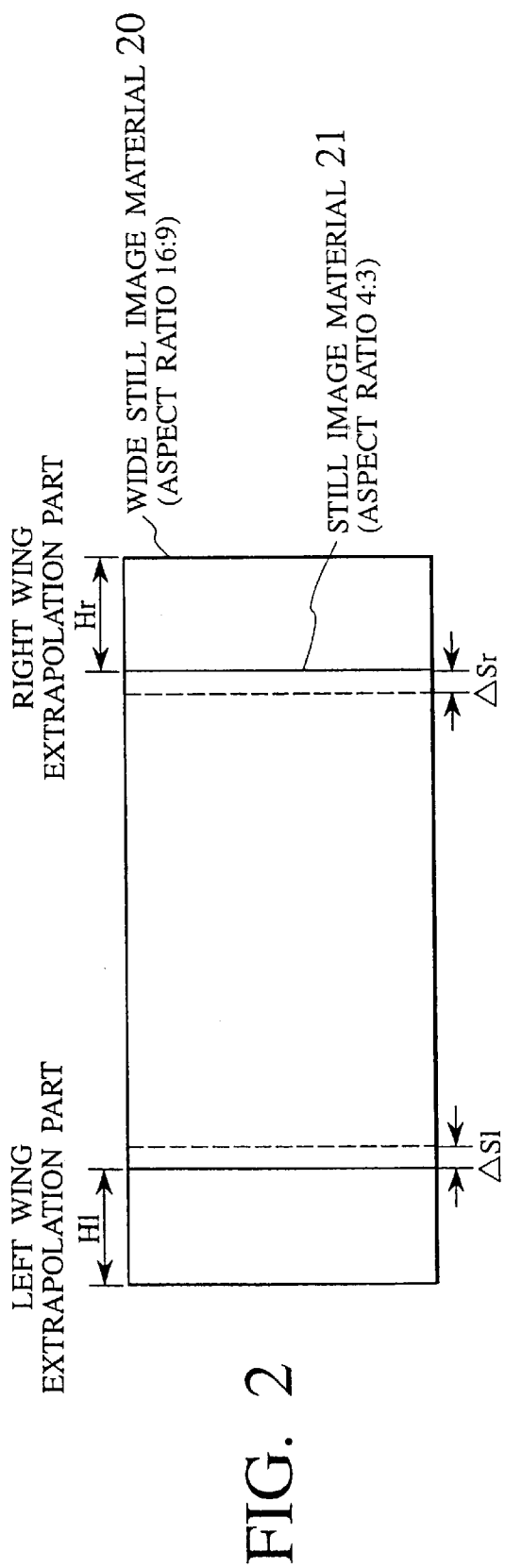
FIG. 2 is a diagram showing a relationship among still image materials different in aspect ratio.

As shown in FIG. 2, a wide still image material 20 having a converted wide aspect ratio of 16:9 corresponds to a still image material 21, having an aspect ratio of 4:3, whose ends are both extended. In the present embodiment, gaps between both ends of the still image material 21 and both ends of the wide still image material 20 are extrapolated. In the following description, the right-side gap is referred to as a right wing extrapolation part Hr, and a left-side gap is referred to as a left wing extrapolation part Hl.

Moreover, the inputted NTSC image signal is subjected to a conversion processing of the aspect ratio converter 1, and is simultaneously digitized with a format of R:G:B=4:4:4 in the A/D converter 2, and then inputted to the both-end pixel extractor 3.

The both-end pixel extractor 3 extracts one to several samples ($\Delta Sr$, $\Delta Sl$) of pixels in the vicinity of both ends of the still image material 21 shown in FIG. 2, and sends the extracted samples to the both-wing image data preparing unit 4.

The both-wing image data preparing unit 4 computes image data to extrapolate the right wing extrapolation part Hr and left wing extrapolation part Hl shown in FIG. 2 based on the obtained pixels as described later, and sends the computed image data to the both-wing extrapolator 5.

The both-wing extrapolator 5 inserts and synthesizes desirable image data computed by the both-wing extrapolator 5 to the right wing extrapolation part Hr and left wing extrapolation part Hl in the wide still image material 20 converted by the aspect ratio converter 1, and outputs the still image material having a wide aspect ratio of 16:9 in which both wing images have been extrapolated.

A few methods of extrapolating the right wing extrapolation part Hr and left wing extrapolation part Hl will concretely be described hereinafter.

(1) Extrapolation by Successive Repetition of the Same Image

Figure 3:
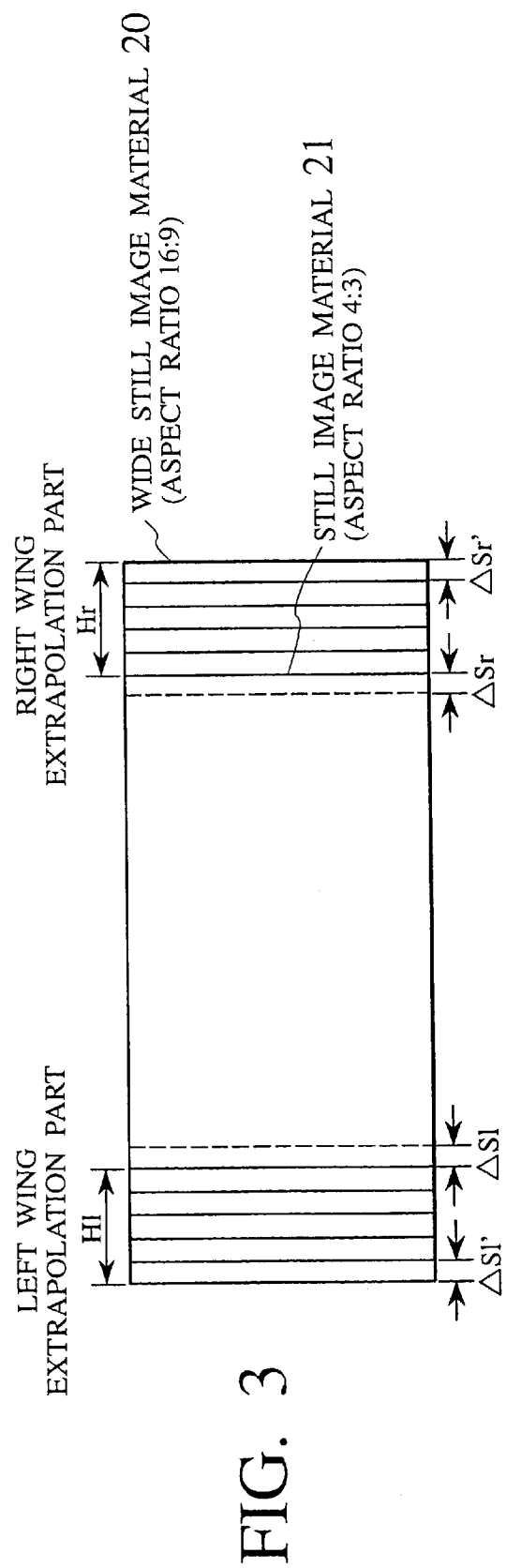
FIG. 3 is an explanatory view of an extrapolation method by successively repeating the same image of the present embodiment.

In FIGS. 1 to 3, the both-wing image data preparing unit 4 obtains several samples $\Delta Sl$ of pixels in the vicinity of the left end of the still image material 21 from the both-end pixel extractor 3, computes several samples $\Delta Sl'$ of image data to be successively repeatedly applied to the left wing extrapolation part Hl, and sends the computed several samples $\Delta Sl'$ to the both-wing extrapolator 5. Here, it is allowable that $\Delta Sl=\Delta Sl'$.

Similarly, the both-wing image data preparing unit 4 obtains several samples $\Delta Sr$ of pixels in the vicinity of the right end of the still image material 21 having an aspect ratio of 4:3 from the both-end pixel extractor 3, computes several samples $\Delta Sr'$ of image data to be successively repeatedly applied to the right wing extrapolation part Hr, and sends the computed several samples $\Delta Sr'$ to the both-wing extrapolator 5. Here, it is allowable that $\Delta Sr=\Delta Sr'$.

Figure 4:
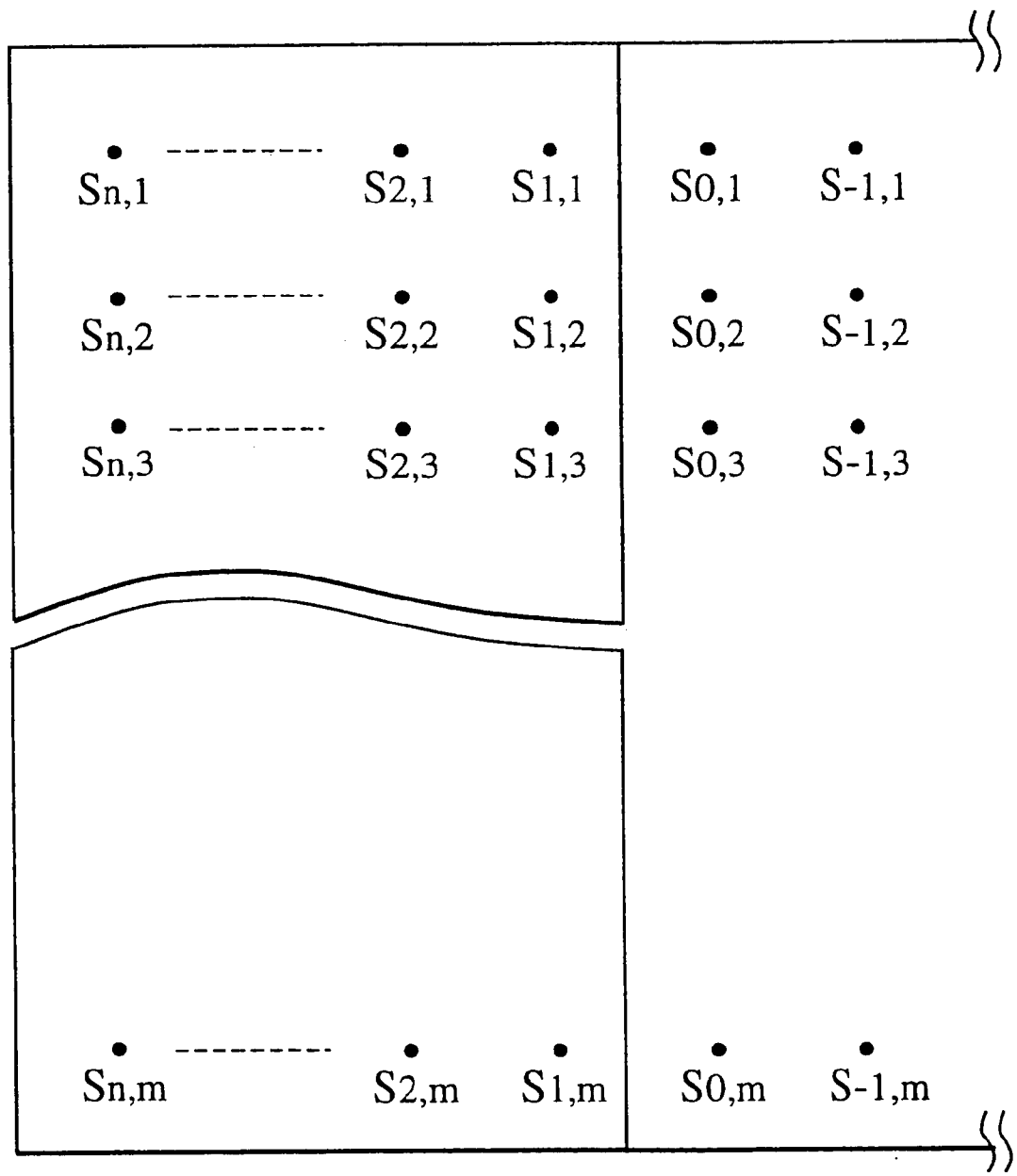
FIG. 4 is a detailed explanatory view of the extrapolation method by the successive repetition shown in FIG. 3.

In FIG. 4, for example, when one left-end sample of the still image material having an aspect ratio of 4:3 is repeated, the following equations (1) are represented.

$$S_{n,1} = S_{n-1,1} = \cdots = S_{2,1} = S_{1,1} = S_{0,1}$$
$$S_{n,2} = S_{n-1,2} = \cdots = S_{2,2} = S_{1,2} = S_{0,2}$$
$$\vdots$$
$$S_{n,m} = S_{n-1,m} = \cdots = S_{2,m} = S_{1,m} = S_{0,m}$$
(1)

Moreover, in FIG. 4, when two left-end samples of the still image material having an aspect ratio of 4:3 are repeated, the following equations (2) are represented.

$$S_{1,1} = S_{3,1} = S_{5,1} = \cdots = S_{-1,1}$$
$$S_{2,1} = S_{4,1} = S_{6,1} = \cdots = S_{0,1}$$
$$S_{1,2} = S_{3,2} = S_{5,2} = \cdots = S_{-1,2}$$
$$S_{2,2} = S_{4,2} = S_{6,2} = \cdots = S_{0,2}$$
$$\vdots$$
$$S_{1,m} = S_{3,m} = S_{5,m} = \cdots = S_{-1,m}$$
$$S_{2,m} = S_{4,m} = S_{6,m} = \cdots = S_{0,m}$$
(2)

Furthermore, in FIG. 4, the similar technique may be used even when three samples are repeated. Moreover, the extrapolation of the right end part may be performed in the same technique as that of the left end part.

The both-wing extrapolator 5 successively and repeatedly applies several samples ΔSl' of image data to the left wing extrapolation part Hl, and successively and repeatedly applies several samples ΔSr' of image data to the right wing extrapolation part Hr, so that the left wing extrapolation part Hl and right wing extrapolation part Hr of the wide still image material 20 are extrapolated.

(2) Extrapolation by Monotonous Decrease Operation of Gradation Property

Figure 5:
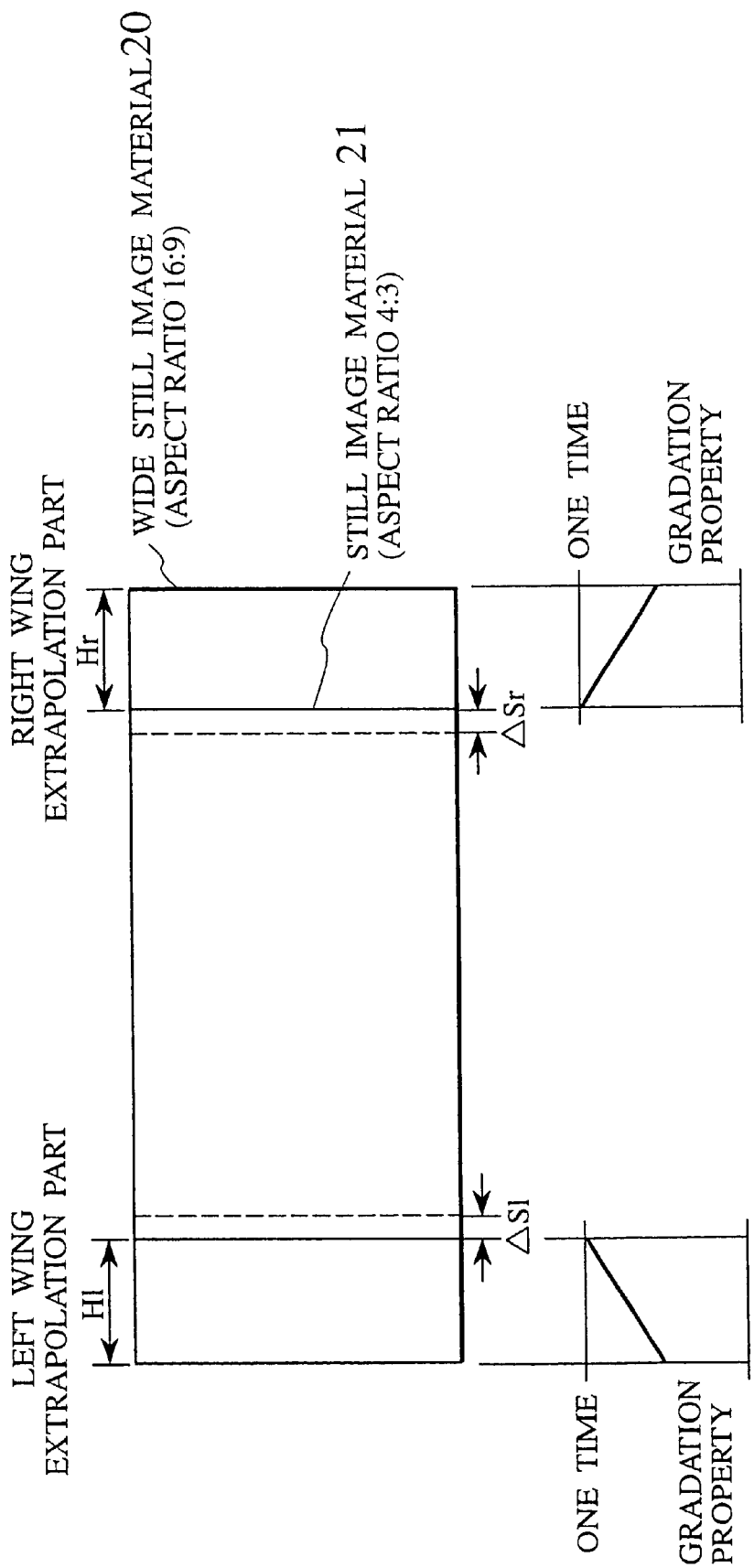
FIG. 5 is an explanatory view of the extrapolation method by a monotonous decrease operation of a gradation property according to the present embodiment.

In FIGS. 1, 2, 5, the both-wing image data preparing unit 4 obtains several samples ΔSl of pixels in the vicinity of the left end of the still image material 21 from the both-end pixel extractor 3, computes image data whose gradation property (luminance level, hue, γ property, and the like, the same will apply to the following) monotonously decreases in the left wing extrapolation part Hl as shown in the following equation (3), and sends the computed image data to the both-wing extrapolator 5.

Similarly, the both-wing image data preparing unit 4 obtains several samples ΔSr of pixels in the vicinity of the right end of the still image material 21 from the both-end pixel extractor 3, computes image data whose gradation property monotonously decreases in the right wing extrapolation part Hr as shown in the following equation (3), and sends the computed image data to the both-wing extrapolator 5.

Figure 6:
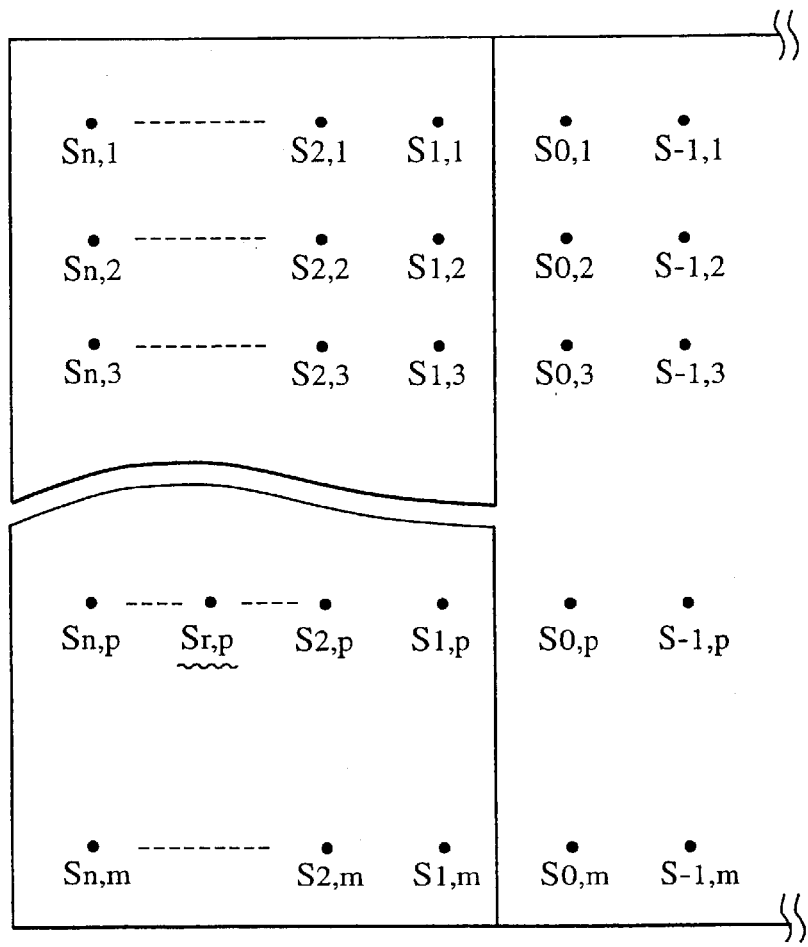
FIG. 6 is a detailed explanatory view of the extrapolation method by the monotonous decrease operation of the gradation property shown in FIG. 5.

Now, in FIG. 6, when it is assumed that the luminance of point $S_{0,p}$ is $A(S_{0,p})$, and the luminance of point $S_{n,p}$ is $A(S_{n,p})$, the luminance $A(S_{r,p})$ of $S_{r,p}$ can be represented by the equation (3).

$$A(S_{r,p}) = \{A(S_{n,p}) - A(S_{0,p})\} \cdot S_{r,p}/(S_{n,p} - S_{0,p}) + \{A(S_{n,p}) \cdot S_{n,p} - A(S_{n,p}) \cdot S_{0,p}\}/(S_{n,p} - S_{0,p})$$
(3)

Additionally, for the hue and γ property, the equation (3) can similarly be applied simply by changing the luminance to the hue or the γ property in the equation.

The both-wing extrapolator 5 applies the image data computed for the left wing extrapolation part Hl and having the monotonously decreasing gradation property to the left wing extrapolation part Hl, and applies the image data computed for the right wing extrapolation part Hr and having the monotonously decreasing gradation property to the right wing extrapolation part Hr, to extrapolate the left wing extrapolation part Hl and right wing extrapolation part Hr of the wide still image material 20.

Figure 7:
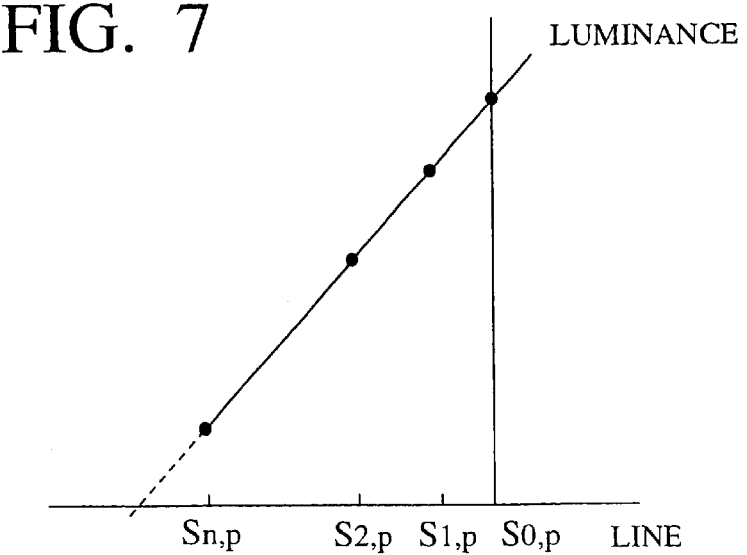
FIG. 7 is an explanatory view showing one example of a monotonous decrease function.

It should be noted that, FIG. 5 shows an example of using a linear function conversion table as shown in FIG. 7 to compute the linearly decreasing image data, but alternatively, for example, a sine function conversion table may be used to compute the image data decreasing in a sine curve manner.

(3) Extrapolation by Operation of Defocus Amount

Figure 8:
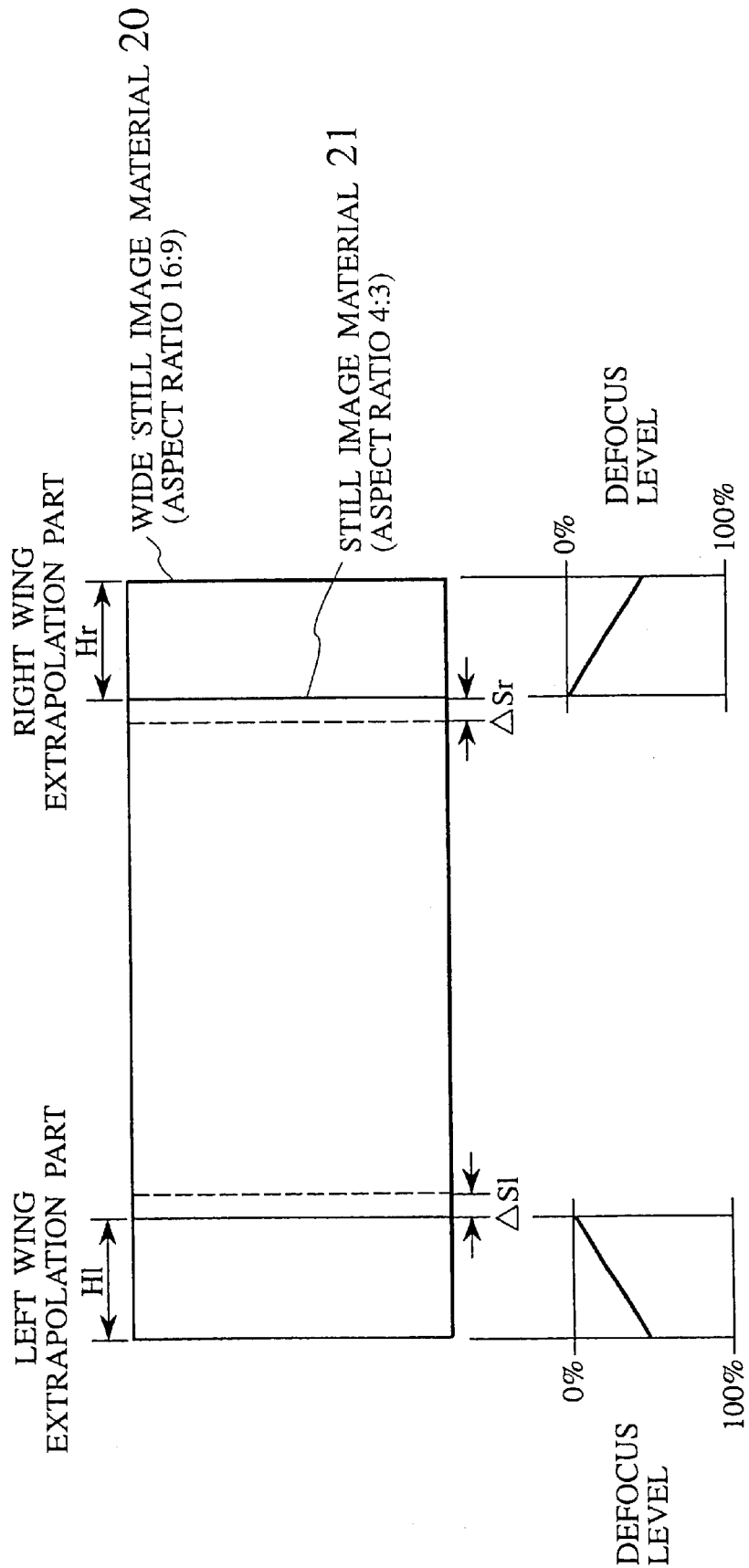
FIG. 8 is an explanatory view of the extrapolation method by a defocus amount operation according to the present embodiment.

In FIGS. 1, 2, 8, the both-wing image data preparing unit 4 obtains several samples ΔSl of pixels in the vicinity of the left end of the still image material 21 from the both-end pixel extractor 3, gradually increases defocus amount in accordance with the defocus level of the obtained several samples ΔSl so as to compute image data which can be extrapolated from the left end of the still image material 21 to the left end of the wide still image material 20 in the left wing extrapolation part Hl, and sends the computed image data to the both-wing extrapolator 5. Here, the defocus amount means the deviation amount of focus of image.

The both-wing image data preparing unit 4 obtains several samples ΔSr of pixels in the vicinity of the right end of the still image material 21 from the both-end pixel extractor 3, gradually increases defocus amount in accordance with the defocus level of the obtained several samples ΔSr so as to compute the image data which can be extrapolated from the right end of the still image material 21 to the right end of the wide still image material 20 in the right wing extrapolation part Hr, and sends the computed image data to the both-wing extrapolator 5.

The extrapolation by defocusing is performed in a technique of increasing the defocus amount, for example, by performing an average value processing of four samples from the material right end (or left end), and performing the average value processing of the next nine samples.

Specifically, in FIG. 9, by repeating the left end samples (two samples in the present example) of the still image material having an aspect ratio of 4:3 as follows, each wing extrapolated image as an extrapolation basis is prepared.

$$S_{1,1} = S_{3,1} = S_{5,1} = S_{7,1} = \cdots = S_{-1,1}$$
$$S_{2,1} = S_{4,1} = S_{6,1} = S_{8,1} = \cdots = S_{0,1}$$
$$S_{1,2} = S_{3,2} = S_{5,2} = S_{7,2} = \cdots = S_{-1,2}$$
$$S_{2,2} = S_{4,2} = S_{6,2} = S_{8,2} = \cdots = S_{0,2}$$
$$\vdots$$
$$S_{1,m} = S_{3,m} = S_{5,m} = S_{7,m} = \cdots = S_{-1,m}$$
$$S_{2,m} = S_{4,m} = S_{6,m} = S_{8,m} = \cdots = S_{0,m}$$
(4)

Figure 9:
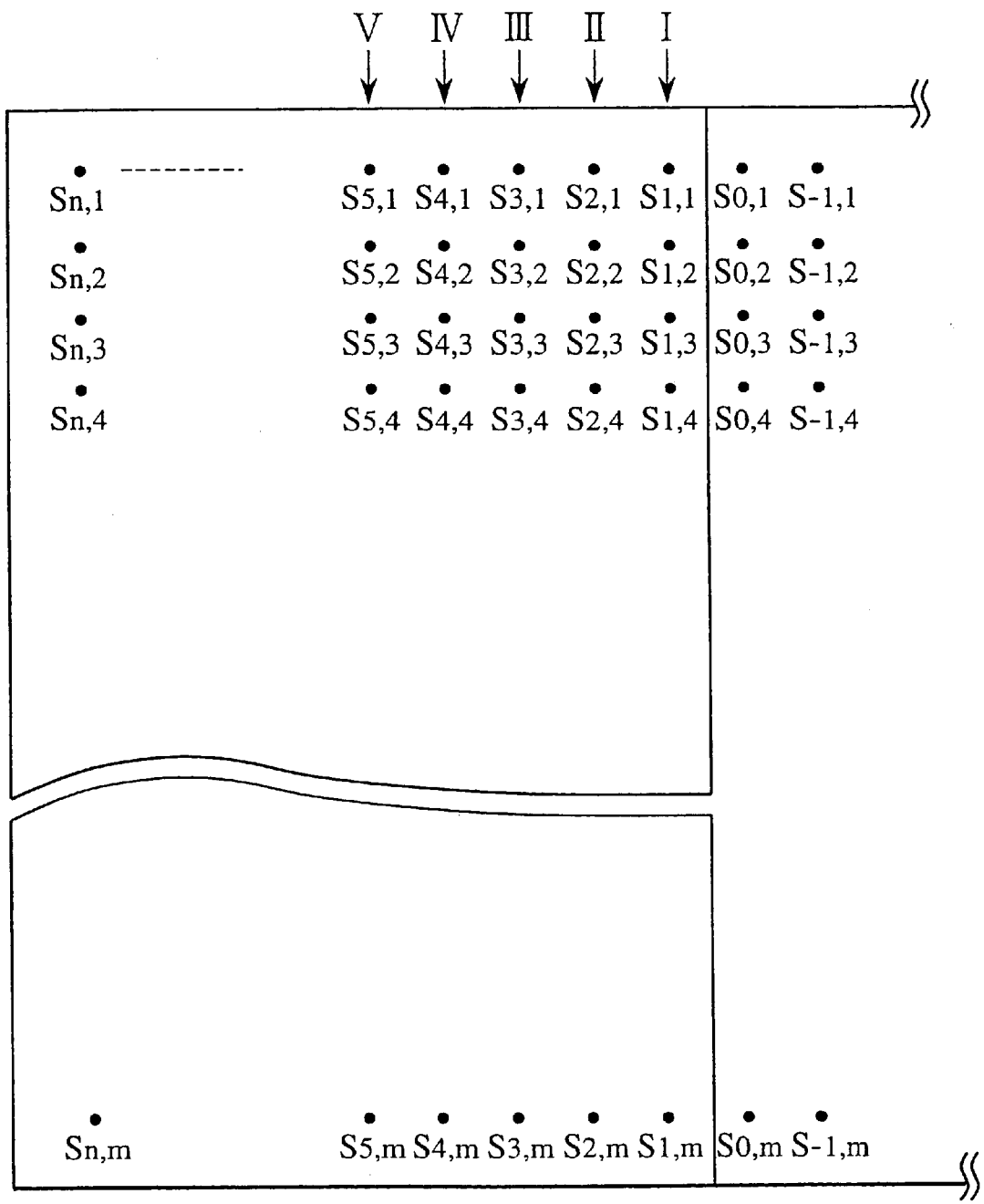
FIG. 9 is a detailed explanatory view of the extrapolation method by the defocus amount operation shown in FIG. 8.

Subsequently, based on the extrapolated image prepared as described above, all the values of the four samples shown by I, II of FIG. 9 are assigned with the same value obtained by averaging the values of the four samples as follows.

$$S_{1,1} = S_{2,1} = S_{1,2} = S_{2,2} = (S_{1,1} + S_{2,1} + S_{1,2} + S_{2,2})/4$$
$$S_{1,3} = S_{2,3} = S_{1,4} = S_{2,4} = (S_{1,3} + S_{2,3} + S_{1,4} + S_{2,4})/4$$
$$\vdots$$
$$S_{1,m-1} = S_{2,m-1} = S_{1,m} = S_{2,m} = (S_{1,m-1} + S_{2,m-1} + S_{1,m} + S_{2,m})/4$$
(5)

Subsequently, to increase the defocus amount, based on nine samples shown by III, IV, V, the image to be extrapolated is prepared as follows.

$$S_{3,1} = S_{4,1} = S_{5,1} = S_{3,2} = S_{4,2} = S_{5,2} = S_{3,3} = S_{4,3} = S_{5,3} = (S_{3,1} + S_{4,1} + S_{5,1} + S_{3,2} + S_{4,2} + S_{5,2} + S_{3,3} + S_{4,3} + S_{5,3})/9$$
(6)

The both-wing extrapolator 5 applies the image data computed for the left wing extrapolation part Hl as described above and having the gradually increasing defocus amount to the left wing extrapolation part Hl, and applies the image data computed for the right wing extrapolation part Hr as described above and having the gradually increasing defocus amount to the right wing extrapolation part Hr, to extrapolate the left wing extrapolation part Hl and right wing extrapolation part Hr of the wide still image material 20.

It should be noted that, FIG. 8 shows an example of using the linear function conversion table to compute the image data whose defocus amount linearly increases, but alternatively, a sine function conversion table may be used to compute the image data which increases in a sine curve manner.

The above-described image aspect ratio converting apparatus of the present invention can be applied to either a transmission side or a reception side. However, when an aspect ratio converter is expensive, it is preferable to apply the apparatus to the transmission side. For example, when 525(NTSC) having an aspect ratio of 4:3 is converted to the high vision, it is better to do so, since an up-converter from NTSC- to high vision is expensive.

As described above, according to the present invention, when an image material having an aspect ratio of 4:3 is outputted as it is to the screen having the wide aspect ratio, both ends of the horizontal scanning direction of the image signal having the wide aspect ratio are subjected to the predetermined desirable extrapolation processing, so that the conversion to the image material having the wide aspect ratio can be performed with the natural property being held.

It should be understood that many modifications and adaptations of the invention will become apparent to those skilled in the art and it is intended to encompass such obvious modifications and changes in the scope of the claims appended hereto.

What is claimed is:

1. An image aspect ratio converting apparatus comprising:

aspect ratio converting means for converting an image signal having an aspect ratio of 4:3 to an image signal having a predetermined wide aspect ratio;

image extracting means for extracting a predetermined amount of a left end image and a predetermined amount of a right end image of a horizontal scanning period of the image signal having an aspect ratio of 4:3; and extrapolating means for using said extracted predetermined amount of the left end image to extrapolate a region of from the left end of the horizontal scanning period of the image signal having an aspect ratio of 4:3 to the left end of the horizontal scanning period of the image signal having said wide aspect ratio, and for using said extracted predetermined amount of the right end image to extrapolate a region of from the right end of the horizontal scanning period of the image signal having an aspect ratio of 4:3 to the right end of the horizontal scanning period of the image signal having said wide aspect ratio.

2. The image aspect ratio converting apparatus according to claim 1 wherein said extrapolating means repeatedly applies one to several samples of images generated from said extracted predetermined amount of the left end image to the region of from the left end of the horizontal scanning period of the image signal having an aspect ratio of 4:3 to the left end of the horizontal scanning period of the image signal having said wide aspect ratio, and repeatedly applies one to several samples of images generated from said extracted predetermined amount of the right end image to the region of from the right end of the horizontal scanning period of the image signal having an aspect ratio of 4:3 to the right end of the horizontal scanning period of the image signal having said wide aspect ratio.

3. The image aspect ratio converting apparatus according to claim 1 wherein said extrapolating means extrapolates the region of from the left end of the horizontal scanning period of the image signal having an aspect ratio of 4:3 to the left end of the horizontal scanning period of the image signal having said wide aspect ratio with an image so generated from said extracted predetermined amount of the left end image as to have a monotonously decreased gradation property, and extrapolates the region of from the right end of the horizontal scanning period of the image signal having an aspect ratio of 4:3 to the right end of the horizontal scanning period of the image signal having said wide aspect ratio with an image so generated from said extracted predetermined amount of the right end image as to have a monotonously decreased gradation property.

4. The image aspect ratio converting apparatus according to claim 3 wherein said gradation property comprises at least one of luminance, hue, and γ property.

5. The image aspect ratio converting apparatus according to claim 1 wherein said extrapolating means extrapolates the region of from the left end of the horizontal scanning period of the image signal having an aspect ratio of 4:3 to the left end of the horizontal scanning period of the image signal having said wide aspect ratio with an image so generated from said extracted predetermined amount of left end image as to have a gradually increased defocus amount, and extrapolates the region of from the right end of the horizontal scanning period of the image signal having an aspect ratio of 4:3 to the right end of the horizontal scanning period of the image signal having said wide aspect ratio with an image so generated from said extracted predetermined amount of right end image as to have a gradually increased defocus amount.

* * * * *

UNITED STATES PATENT AND TRADEMARK OFFICE
CERTIFICATE OF CORRECTION

PATENT NO.     : 6,519,006 B1
DATED          : February 11, 2003
INVENTOR(S)    : Akira Nakamura et al.

It is certified that error appears in the above-identified patent and that said Letters Patent is hereby corrected as shown below:

<u>Title page,</u>
Insert Item -- [73] Assignee: Nippon Hoso Kyokai, Tokyo, JAPAN --

Signed and Sealed this

Eighteenth Day of November, 2003

JAMES E. ROGAN
*Director of the United States Patent and Trademark Office*